United States Patent [19]

Shadburn

[11] 3,770,312
[45] Nov. 6, 1973

[54] PICKUP TRUCK CAB WITH RETRACTABLE OR REMOVABLE REAR WINDOW
[75] Inventor: Whelchel Artis Shadburn, Placentia, Calif.
[73] Assignee: Sparton Management Services, Inc., Placentia, Calif.
[22] Filed: Dec. 23, 1971
[21] Appl. No.: 211,621

[52] U.S. Cl. .................. 296/28 C, 49/394, 49/402, 296/146
[51] Int. Cl. ............................................. B60j 1/18
[58] Field of Search ................... 296/28 C, 23 MC, 296/146, 147, 148; 49/394, 396, 402; 52/291

[56] References Cited
UNITED STATES PATENTS
2,016,174  10/1935  Morrison ........................ 49/402 X
3,346,297  10/1967  Colautti et al. .................... 296/146
1,935,468  11/1933  Dittus ............................ 296/147
3,321,234   5/1967  Harrel et al. .................... 296/23 MC FOREIGN PATENTS OR APPLICATIONS
1,146,767  4/1963  Germany ........................... 296/146
  474,596  9/1952  Italy ............................... 296/146

Primary Examiner—Benjamin Hersh
Assistant Examiner—John A. Pekar
Attorney—Ford W. Harris, Jr. et al.

[57] ABSTRACT

A pickup truck cab having a rear window which is movable from a closed position to an open position, or removable, to provide a passageway between the interior of the cab and a camper, or the like, carried by the truck. The window is mounted for swinging movement into and out of its closed position and, when closed, the window is seated on a seal encompassing the window opening.

4 Claims, 6 Drawing Figures

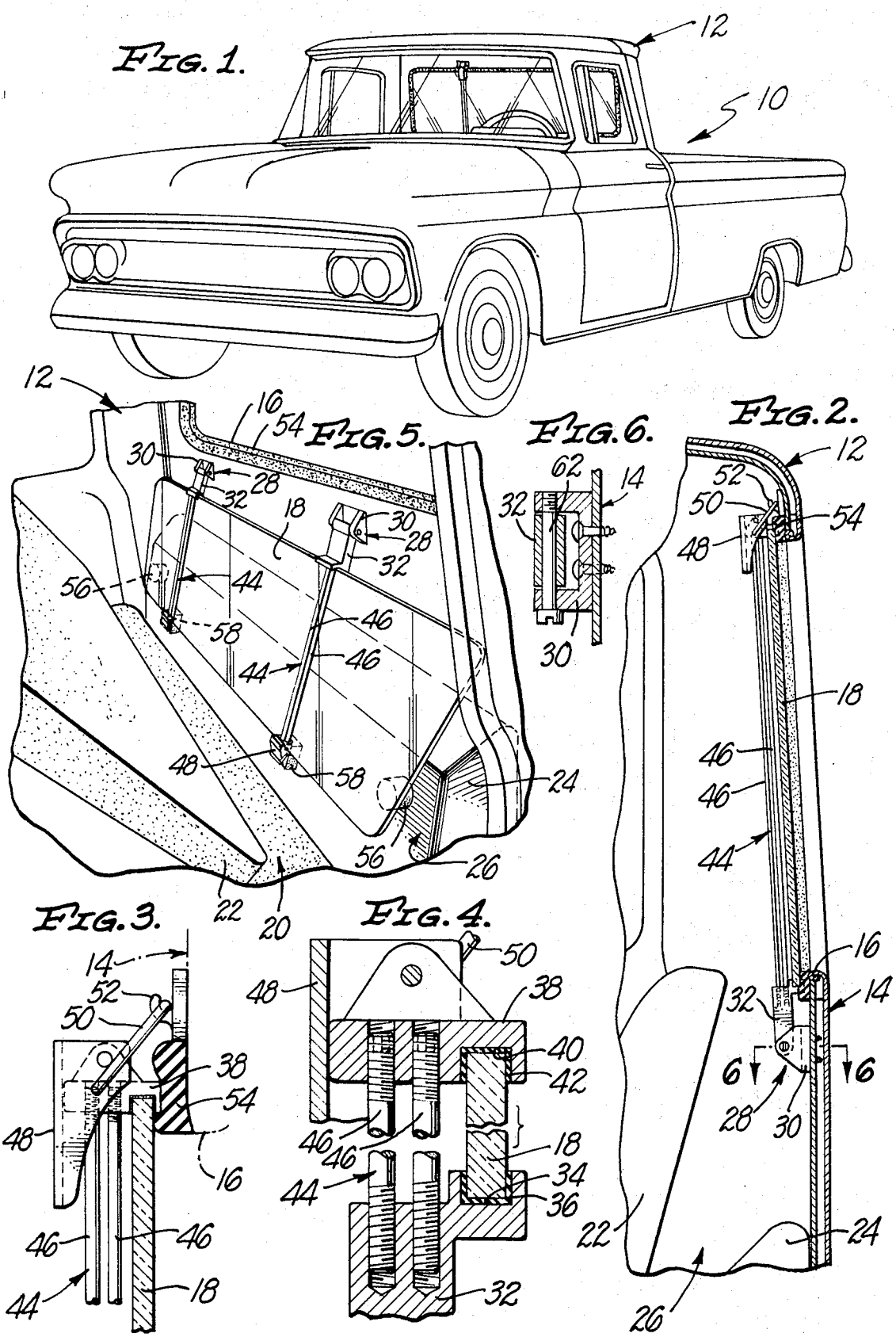

PICKUP TRUCK CAB WITH RETRACTABLE OR REMOVABLE REAR WINDOW

BACKGROUND OF INVENTION

The present invention relates in general to a so-called pickup truck and, more particularly, to a rear window installation for a pickup truck cab. Although the invention is particularly applicable to a pickup truck, and will be considered in connection with a pickup truck for convenience, it will be understood that it is not necessarily limited thereto.

In recent years, pickup trucks equipped with so-called campers have become very popular for recreational and other purposes, and have at least partially replaced the so-called house trailers. Perhaps the major advantage of pick-up truck and camper combinations is that they are much more compact and easier to handle than automobile and house trailer combinations. Further, passengers can be carried in the campers, whereas this is unsafe with house trailers and illegal in many areas.

With many pickup truck and camper combinations, the rear window of the truck cab is removed to provide a passageway for ventilation and for the transfer of passengers, food, drink, and the like, between the cab and the camper while traveling.

SUMMARY AND OBJECTS OF THE INVENTION

With the foregoing background in mind, a primary object of the invention is to provide a rear window installation for a pickup truck cab wherein the rear window can readily be moved into an open position, or removed, when the camper is mounted on the pickup truck, and can readily be closed, or reinstalled, when the camper is removed.

More particularly, an important object of the invention is connection with one embodiment thereof is to provide an installation wherein the rear window of the cab is swingable downwardly and forwardly into a storage space behind the back of the seat of the truck, the seat back being tiltable forwardly and downwardly away from the rear wall of the cab to permit such swinging movement of the window downwardly into a retracted position.

Another important object of the invention is to provide hinge means on the rear wall of the cab below the window opening and connected to the window, such hinge means providing for swinging movement of the window into and out of its closed position.

Yet another object is to provide an installation which includes: two hinge members spaced apart along and engaging the edge of the window which is lowermost when the window is in its closed position; two bracket members spaced apart along and engaging the edge of the window which is uppermost when the window is in its closed position; and two rod means respectively interconnecting the bracket and hinge members. A related object is to provide a construction wherein each rod means includes two parallel rods interconnecting the corresponding bracket and hinge members and threaded into them to adjust the spacing between such members to the height of the window.

Still another important object of the invention is to provide seal means encompassing the window opening and engageable by the window to provide a weather-tight seal around the window when it is in its closed position. A related object is to provide means for releasably securing the window in its closed position against its seal means.

The foregoing objects, advantages, features and results of the present invention, together with various other objects, advantages, features and results thereof which will be evident to those skilled in the art in the light of this disclosure, may be achieved with the exemplary embodiments of the invention illustrated in the accompanying drawing and described in detail hereinafter.

DESCRIPTION OF DRAWING

In the drawing:

FIG. 1 is a perspective view of a pickup truck which embodies the invention;

FIG. 2 is a vertical sectional view through the rear wall of the cab of the pickup truck, showing a retractable rear window of the cab in its closed position;

FIG. 3 is a fragmentary vertical sectional view similar to the upper portion of FIG. 2, but on a larger scale;

FIG. 4 is a fragmentary vertical sectional view showing a rod means interconnecting bracket and hinge members to hold the rear window therebetween;

FIG. 5 is a perspective view showing the rear window retracted forwardly and downwardly into a storage space between the seat of the pickup truck and the rear wall of the cab, the seat being shown tilted forwardly and downwardly for clarity; and FIG. 6 is a fragmentary sectional view taken along the arrowed line 6—6 of FIG. 2.

DETAILED DESCRIPTION OF EXEMPLARY EMBODIMENT OF INVENTION

Referring to the drawing, designated generally therein by the numeral 10 is a pickup truck having a cab 12 which includes a vehicle in the form of a rear wall 14 provided with a window opening 16 adapted to be closed by a window 18. The truck cab 12 is also provided therein with a seat 20 having a back 22 which, when in its upright position, as shown in FIG. 2, is spaced forwardly from the rear wall 14 of the cab 12, and forwardly from the fuel tank 24 of the pickup truck 10, to provide a storage space 26. This storage space is adapted to receive the window 18 when the latter is pivoted downwardly and forwardly from its closed position into a retracted or open position in a manner to be described. The seat back 22 is tiltable forwardly and downwardly, as shown in FIG. 5, to permit swinging movement of the rear window 18 between its open and closed positions. The seat back 22 is maintained in its upright position by stops, not shown, in a conventional manner.

Mounted on the rear wall 14 of the truck cab 12 below the window opening 16 are two transversely spaced hinges or hinge means 28 each comprising a hinge member 30 secured to the rear cab wall and a pivoted hinge member 32. Each pivoted hinge member 32 is provided, as best shown in FIG. 4, with a channel 34 receiving the edge of the window 18 which is lowermost when the window is in its closed position. A cushioning element 36 in each channel 34 separates the window 18 from the corresponding hinge member 32. Opposite the hinge members 32, and connected thereto in a manner to be described, are bracket members 38 each having a channel 40 receiving the opposite edge of the window 18. Again, a cushioning element 42 in each channel separates the corresponding bracket member 38 from the window 18. Each bracket member 38 is connected to the corresponding hinge member 32 by a rod means 44 comprising two parallel rods 46 spaced apart in a plane perpendicular to the plane of the window 18. Each rod 46 is threaded into the corresponding hinge and bracket members 32 and 38 by threads of opposite hands. With this construction, by relatively rotating the rods 46 of each rod means 44 as required, the spacing of the corresponding hinge and bracket members 32 and 38 can be adjusted very accurately to hold the window 18 firmly, but without inducing any undesirable stresses therein, which is an important feature of the invention. Further, the two rods 46 of each rod means 44 provide a sturdy and reliable interconnection between the corresponding hinge and bracket members 32 and 38.

Each bracket member 38 supports a pivotally connected toggle handle 48 which, in turn, has a toggle link 50 pivotally connected thereto, the latter being engageable with a complementary hook 52, FIG. 3, mounted on the rear wall 14 of the truck cab 12 above the window opening 16. As will be apparent, the toggle links 50 are engageable with the hooks 52 to hold the window 18 in its closed position. As will be further apparent from FIG. 3 in particular, the toggle mechanisms formed by the handles 48 and the links 50 move over center relative to the pivotal connections between the handles and the links when the handles 48 are pivoted downwardly with the links 50 in engagement with the hooks 52. This construction positively holds the periphery of the window 18 in a locked weathertight engagement with a gasket or seal means 54 encompassing the window opening 16 and suitably secured to the rear wall 14 of the truck cab 12, as by bonding.

When it is desired to open the window 18 to permit utilizing the window opening 16 as a passageway in the manner hereinbefore discussed, it is merely necessary to tilt the seat back 22 downwardly and forwardly and to release the toggle links 50 from the hooks 52, whereupon the window 18 may be swung downwardly and forwardly into the storage space 26 between the seat back and the fuel tank 24. Resilient bumpers 56 suitably secured to the fuel tank 24, as by bonding, engage the window 18 near the ends thereof to space it from the fuel tank to guard against breakage and to prevent rattling. Additional resilient bumpers 58 suitably secured to the fuel tank 24 engage the toggle handles and links 48 and 50 to prevent rattling of these elements and to further support the window in its open or retracted position.

As will be apparent, the present invention provides a very simple way of swinging the window 18 back and forth between its open and closed positions, and, at the same time, provides a sturdy and reliable supporting structure for the window which imposes no undesired stresses thereon and which precludes rattling when the window is open. When the window 18 is closed, the toggle mechanisms hereinbefore discussed hold it firmly against the seal means 54 to provide a completely weathertight installation.

The foregoing embodiment of the invention requires a pickup truck 10 having the tiltable seat back 22 and the storage space 26. However, the invention may also be utilized with pickup trucks, not shown, lacking such features by simply removing the window 18, and storing it in any suitable location, when a camper is mounted on the truck.

With the foregoing in mind, each hinge 28 comprises a removable hinge pin 62 threaded into the hinge member 30, as shown in FIG. 6. With this construction, the window 18 can be removed completely simply by removing the two hinge pins 62 and unlatching the toggle mechanism 48 and 50. Conversely, it can be reinstalled very easily by reinstalling the hinge pins 62 and reactivating the toggle mechanisms.

Although exemplary embodiemnts of the invention have been disclosed for purposes of illustration, it will be understood that various changes, modifications, and substitutions may be incorporated in such embodiment without departing from the spirit of the invention as defined by the claims which follow.

I claim as my invention:

1. In combination with a truck cab provided with a rear wall having a window opening:
   a. a window for said opening;
   b. means mounting said window on said rear wall for swinging movement into and out of a closed position wherein said window closes said opening, said mounting means including hinge means mounted on said rear wall below said opening and connected to said window and wherein said hinge means includes two hinge members spaced apart along and engaging the end of said window which is lowermost when said window is in its closed position;
   c. two bracket members spaced apart along and engaging the edge of said window which is uppermost when said window is in its closed position; and
   d. two rod means respectively interconnecting said bracket and hinge members.

2. The combination defined in claim 1 wherein each of said rod means includes two rods interconnecting the corresponding bracket and hinge members and threaded into them.

3. A vehicle window system comprising:
   a. a vehicle body having a window opening
   b. seal means attached to the interior of said vehicle body and positioned about said window opening;
   c. a window mounted to said vehicle body and movable between two positions, a first position wherein said window is in engagement with said seal means to cover said window opening and a second position wherein said window is disengaged from said seal means for storage;
   d. means for mounting said window to said vehicle body including spaced hinges having removable hinge pins for allowing removal of said window from said vehicle body; and
   e. bracket means spaced apart from one another and connected to said window along an edge opposite the hinges, and bracket means including links cooperating with hooks fastened to said vehicle body for retaining said window in its first position.

4. A vehicle window system as claimed in claim 3 wherein
   each of said bracket means includes a support member to which is pivotally connected to toggle handle and a link, said link and toggle handle moving over center past the pivotal connection when said link lockingly engages a hook; and including
   a pair of rods having ends connecting each hinge and a corresponding support member, said rods being threaded at each end wherein rotation in one direction of said rods move the hinge and the support member toward one another.

* * * * *